June 10, 1941.  H. A. UNKE  2,245,419

THREADED THIN-WALLED ARTICLE

Filed June 22, 1938

INVENTOR.

BY HERMAN A. UNKE

Kuis Hudson & Kent

ATTORNEYS

Patented June 10, 1941

2,245,419

UNITED STATES PATENT OFFICE 2,245,419

THREADED THIN-WALLED ARTICLE

Herman A. Unke, Cleveland, Ohio

Application June 22, 1938, Serial No. 215,189

3 Claims. (Cl. 285—145)

This invention relates particularly to a novel form of threads on the end of a thin-walled tube, and the method of threading the same.

Thin-walled metal tubing has many advantages when used for such purposes as conduit for electric wires. One of these advantages is the relatively low cost of this form of tubing, as compared with ordinary steel pipe, and a further advantage is that its lightness facilitates handling and installation. One of the disadvantages of thin-walled tubing is that its walls are so thin that ordinary cut threads could not be used therein for the purpose of connecting different lengths together, or for connecting the tubing to junction boxes and other types of fittings that are commonly used with electric conduit. The objection to cut threads has been that they so weakened the tube that it did not have the requisite strength for the uses to which it was put, and this has led to the design and use of special forms of connections which were not only relatively costly, but objectionable because they were somewhat complicated and required a method of installation that was different from the standard steel conduit that is largely in use.

It is one of the objects of this invention to provide a thin-walled conduit with a form of threads that will not materially weaken the tube and that will, where desired, permit the conduit to be used interchangeably with the standard steel conduit having cut threads.

A further object of the invention is to provide a novel form of threads on a conduit that will not only not materially weaken the conduit but will also leave the interior of the conduit perfectly smooth the same as the common thick-walled conduit having cut threads.

A further object of the invention is to provide a form of thread for a thin-walled conduit that will loosely fit and readily engage with mating coupling devices, at the start, but will be tight when the joint has been completely made up. This feature facilitates the installation of the conduit and makes it similar, in this respect, to the ordinary thick-walled conduit having cut threads.

A further object of the invention is to provide a form of thread that will not only have the advantages above enumerated, but which may be formed on the conduit at a cost which is no greater than that of cutting a thread and, on the other hand, can ordinarily be formed at a lower cost.

A further object of the invention is to provide a form of thread which permits the conduit to be cut to any desired length, in the field, and there threaded as in the case of the ordinary steel thick-walled conduit.

Other objects of the invention and the features of novelty of the conduit itself and the method of threading the same will be apparent from the following description taken in connection with the accompanying drawing, in which Fig. 1 is an enlarged longitudinal section of a thin-walled conduit that has been threaded in accordance with my invention.

Figure 1:
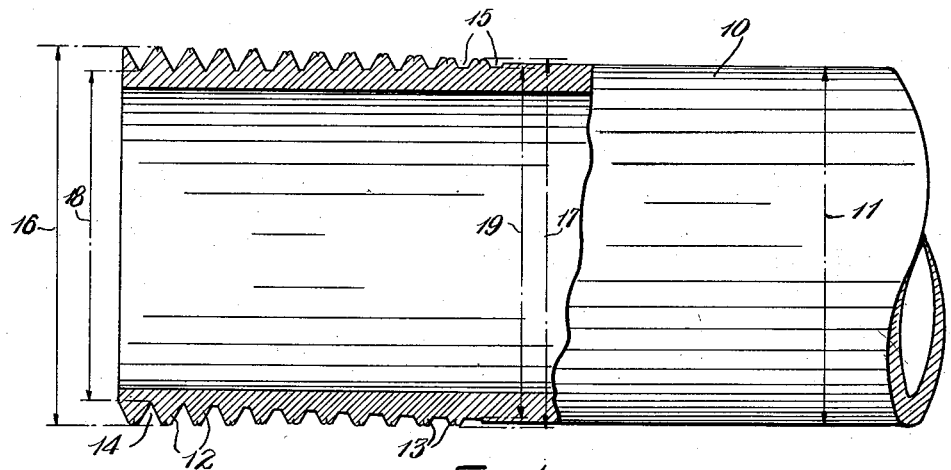

Referring to Fig. 1, the tube 10 is shown with a threaded end portion, the threads of which are made in accordance with my invention. The normal outside diameter of the tube, before the threading operation, is indicated by the dimension line 11 and, since my improved method consists in rolling the threads on the end of the tube, no metal of the tube is cut away and, as is customary in the case of rolled threads, the outside diameter of the threaded portion is increased due to the displacement of the metal in forming the threads.

It will be noted that the threads 12 adjacent the end of the tube are substantially of full V-cross section, whereas the threads 13 at the inner end of the threaded portion are truncated. It will also be noted that the grooves between the threads, adjacent the end of the tube, are of V-form, as indicated at 14, whereas the grooves 15 at the inner end of the threaded portion are truncated or, in other words, have flat bottoms.

One of the results that flows from my improved method of forming the threads is that the outside diameter of the threads adjacent the end of the tube, as indicated by the dimension 16, is substantially greater than the outside diameter of the truncated threads at the inner end of the threaded portion, as indicated by the dimension 17. Another characteristic is that the diameter of the root of the threads, adjacent the end of the tube, as indicated by the dimension 18, is less than the diameter at the root of the threads at the inner end of the threaded portion, as indicated by the dimension 19. In the ordinary cut pipe-thread the outside diameter of the threads adjacent the end is less than the outside diameter of the threads adjacent the inner end of the threaded portion or, in other words, the threads taper toward the end of the tube or pipe. This is the exact opposite of the arrangement of my improved threads because the threads of maximum outside diameter are adjacent the end of the tube so that, generally speaking, the threaded portion tapers from the end of the tube inwardly. However, in forming the threads on the tube the dimensions of the threads adjacent the end are such that they are interchangeable with the standard cut-threads of substantially the same outside diameter.

Figure 2:
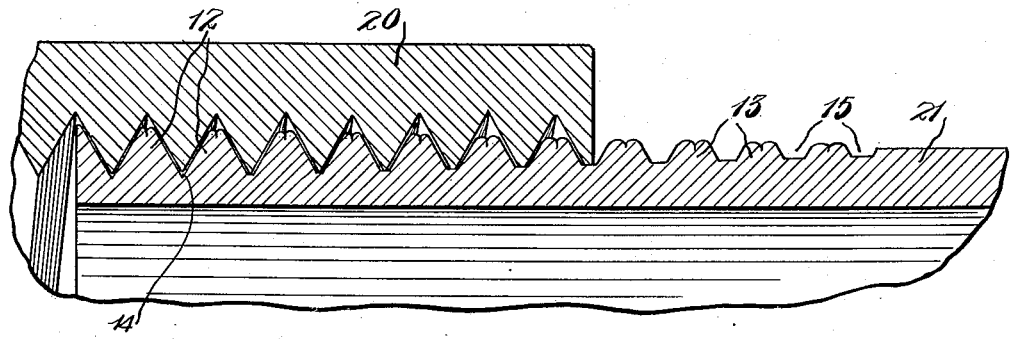
Fig. 2 is an enlarged fragment of Fig. 1 but showing a fragment of a connecting sleeve in position on the conduit.

In Fig. 2 I have illustrated the way in which the male threads on a conduit, embodying my invention, cooperate with the standard threads of a sleeve coupling so as to form a tight connection. The threads at the end of the conduit will freely enter the threads of the coupling but because of the fact that the root diameter of the threads at the inner end of the threaded portion, as illustrated at 19 in Fig. 1, is greater than the root diameter of the end threads, as indicated at 18, it will be apparent that when the coupling 20 is screwed onto the tube 21 the threads adjacent the end of the coupling, which will have an internal diameter that is only slightly greater than the dimension 18, will engage with the flat bottoms of the grooves 15 so tightly that the threads in the coupling will either cut into the bottoms of the grooves 15 or the sharp edges of the threads of the coupling will be flattened and, in either case, the coupling will be tightly connected with the tube.

Figure 3:
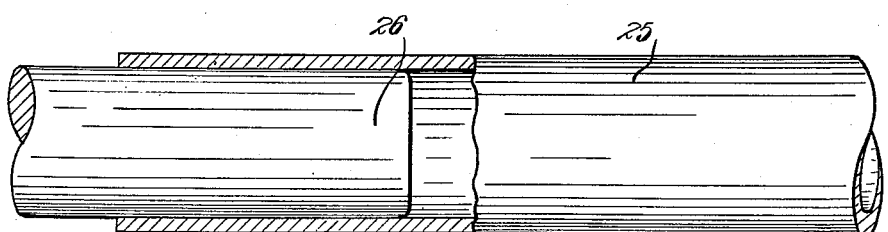
Fig. 3 is a diagrammatic view illustrating a simple method of forming the threads on the conduit.
Figure 4:
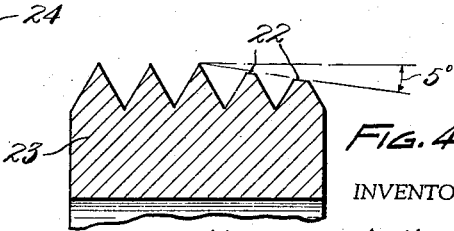
Fig. 4 is an enlarged axial section of a fragment of the thread-forming tool.

The novel method by which I have been able to form the threads, as shown in Fig. 1, is diagrammatically illustrated in Fig. 3. The ordinary method of threading a tube or pipe is to start the die at the end of the pipe and run it therealong for the distance or length of the threaded portion but, in my improved method, I reverse the operation and start the die at the inner end of the threaded portion and run it to the end. This is possible because I employ a rotary thread-rolling die, a section of which is shown in Fig. 4. In making this die I employ a plain cylindrical ring of suitable tool steel and cut a standard V-thread on the exterior thereof, the size and pitch of the thread corresponding with the standard for the size of tubing on which the die is to be used. I then flatten the threads adjacent one end of the die, as indicated at 22, by cutting away the tops of the threads on a taper which I prefer to make 5°, although this is subject to variation. The die 23, as thus made, is then mounted on a suitable arbor 24. The tube to be threaded is indicated at 25 and the end portion thereof is supported on a mandrel 26. The tube 25 may be arranged in the spindle of an ordinary hollow-spindle lathe, whereby it may be rotated, and the mandrel 26 may be mounted in the tailstock of the lathe, or otherwise supported. The die 23 may be mounted on the cross slide of the lathe whereby it may be forced against the tube 25 by the cross-feed screw of the lathe. By positioning the die at the inner end of the portion to be threaded and rotating the tube 25 the thread may be formed by forcing the die into the wall of the tube as the latter rotates, this being done by means of the crossfeed screw of the lathe. As the tube 25 rotates the die 23 is caused to move longitudinally thereof toward the end of the tube and, by forcing the die into the wall of the tube as is customary in forming rolled threads by means of a rotary die, the thread will be formed as shown in Fig. 1.

I have attempted to reverse the operation above described so as to form the thread by starting the die at the end of the tube and running it along the tube to the inner end of the threaded portion, but in every case the attempt failed because the metal at the end of the tube was so stretched, circumferentially, that the result was a flaring of the threaded portion. However, when the die is started at the inner end of the threaded portion and works toward the end of the tube this flaring is obviated, and I attribute this to the fact that such stretching as occurs is longitudinal rather than circumferential.

While I have illustrated in Fig. 4 a diagrammatic method of forming the threads in accordance with my invention, and have described above the way that this method can be practiced in an ordinary lathe, it will be understood that various other mechanisms may be used for forming the threads by hand or by power, and I have illustrated one such mechanism for forming these threads by hand in my copending application Serial No. 216,703, filed June 30, 1938, which matured into Patent No. 2,182,906.

Having thus described my invention, I claim:

1. As a new article of manufacture a cylindrical tube having a threaded end portion in which the threads at the outer end of said portion have a larger outside diameter than the threads at the inner end of said portion and the latter threads have a larger root diameter than the former.

2. As a new article of manufacture a cylindrical tube having a threaded end portion in which the threads at the outer end of said portion have a larger outside diameter than the threads at the inner end of said portion and the latter threads have the top thereof truncated and a larger root diameter than the threads at the outer end of said portion.

3. As a new article of manufacture, a cylindrical tube having a threaded portion with the threads at the outer end of said portion of V-form and the threads and grooves at the inner end of said portion truncated, the outer diameter of the threads at the outer end being larger than that of the threads at the inner end of said portion and the root diameter of the latter threads being larger than that of the others.

HERMAN A. UNKE.